Nov. 26, 1963  L. G. LAKIN  3,112,024
ROLL CONSTRUCTION
Filed Sept. 22, 1961  2 Sheets-Sheet 1
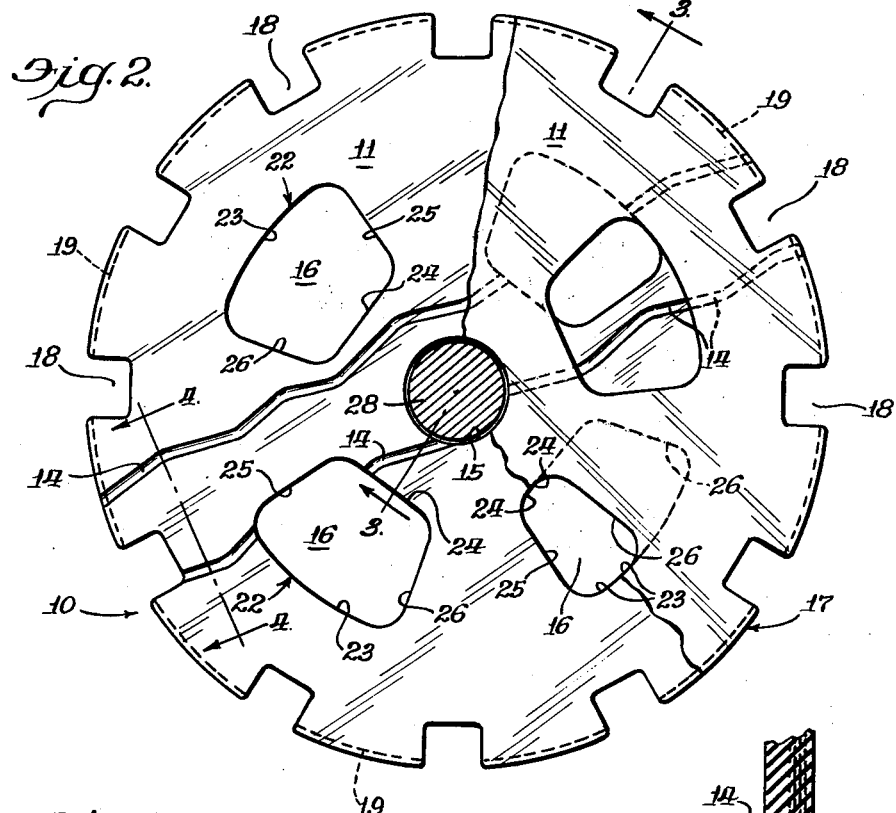
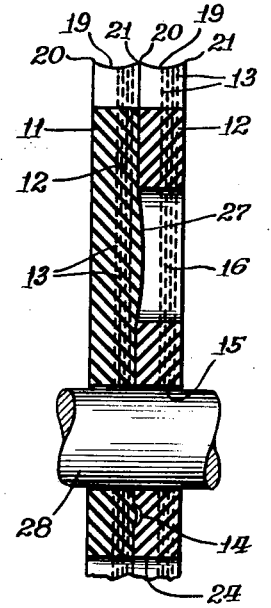
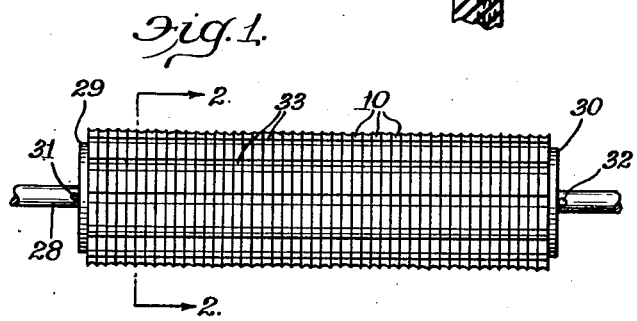
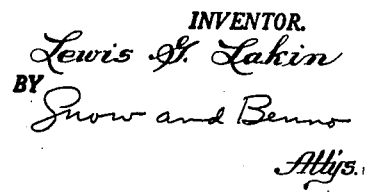
INVENTOR.
Lewis G. Lakin
BY
Snow and Benno
Attys.

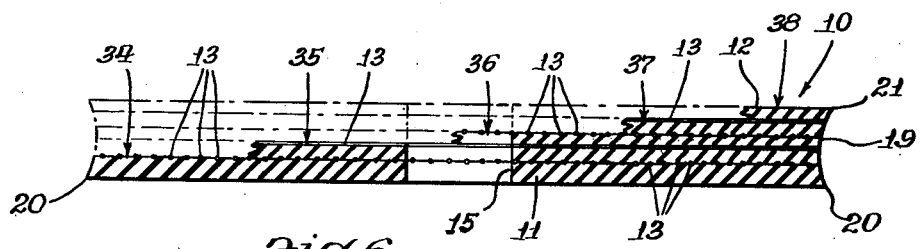

United States Patent Office 3,112,024
Patented Nov. 26, 1963

3,112,024
ROLL CONSTRUCTION
Lewis G. Lakin, Skokie, Ill., assignor to A. Lakin & Sons, Inc., a corporation of Illinois
Filed Sept. 22, 1961, Ser. No. 140,121
8 Claims. (Cl. 198—127)

This invention relates to a new and improved roll construction.

Rolls in agricultural implements are and have been made of many materials depending upon their particular use. Many uses require predominantly rubber rolls. The husking of corn, the conditioning of hay, and the pitching of bales are examples of rubber roll applications. Rubber rolls may be molded in one piece or fabricated of plural parts. Vehicle tire casings of fabric-reinforced, flexible resilient rubber constitute a substantial portion of the rubber made into agricultural rolls. Attention is invited to the Siemen Patents 2,416,123 and 2,416,124 which show and describe rolls made of a laminate of tire carcass discs in farm machines. Rubber tire carcass reinforced with synthetic or natural fiber cords and fabrics, such as nylon, rayon or cotton, makes the resultant roll long-wearing and resistant to abrasion. Also, the cords extending to the periphery or the operating surface of the roll provide an aggressiveness not available with rubber alone. The present invention is concerned with a roll consisting of a laminate of composite discs of a resilient rubber material reinforced with synthetic or natural fibers and commonly referred to as tire carcass rolls.

A principal object of this invention is to provide a roll usable in agricultural machinery and constructed of tire carcass discs.

An important object of this invention is the provision of a roll of laminated tire carcass discs in which the discs are of substantial diameter and yet the over-all weight of the roll is relatively light compared to other comparably operating rolls of similar diameter.

Another important object of this invention is to supply tire carcass discs for roll construction in which the discs have centrally disposed shaft apertures and cutout portions between the central shaft aperture and the periphery to reduce the over-all weight of the discs.

Still another important object of this invention is to equip a rubber tire carcass disc with a plurality of weight-removing openings located uniformly around the disc so that the disc is balanced about its axis of rotation.

Another and further important object of this invention is to provide tire carcass discs in a laminated tire carcass roll in which weight-removing openings located between the center of the disc and the periphery of the disc are arranged in arcuately offset relationship with the weight-removing openings of adjacent discs whereby when the discs are put under an endwise compression there is an effective interengagement of the discs with the openings in adjacent discs.

A further important object of this invention is the provision of a roll constructed of a plurality of tire carcass discs with the circumferential peripheries having a concave shape in cross section so that a completed roll presents annular surface undulations.

Another and still further important object of this invention is to provide a tire carcass roll having a yielding yet aggressive surface to enable the pitching of bales of hay or the like without excessive slipping on or destruction to the surface of the bales being pitched.

Still another important object of this invention is to supply a laminated tire carcass roll in which the plurality of tire carcass discs comprising the roll have indented tread surfaces retained in one side of the discs so that upon applying an endwise compression to the plurality of discs the discs interlock in the tread surfaces to thus restrain separate rotation of any disc relative to an adjacent disc.

Still another important object of this invention is to equip a roll constructed of a plurality of laminated tire carcass discs with a plurality of regular notches around the full periphery thereof.

Another important object of this invention is to provide a laminated tire carcass roll having longitudinal flutes extending the length of the roll and located at substantially regular intervals around the circumference of the roll whereby the roll is aggressive in acting to pitch bales of hay or perform other functions in farm machinery in the harvesting, treating or moving of crops.

Still another important object is to provide an economical roll for use in farm machinery.

Other and further important objects and advantages will become apparent from the disclosures in the following specification and accompanying drawings.

In the drawings:

FIGURE 1 is an elevational view of the roll of this invention;

FIGURE 2 is an enlarged sectional view taken on the line 2—2 of FIGURE 1;

FIGURE 3 is a sectional view taken on the line 3—3 of FIGURE 2;

FIGURE 4 is a sectional view taken on the line 4—4 of FIGURE 2;

FIGURE 5 is a top plan view of a disc with various plies removed to show the pattern of the fibers; and FIGURE 6 is a sectional view taken on the line 6—6 of FIGURE 5.

As shown in the drawings, the reference numeral 10 indicates generally a disc cut from tire carcass and preferably the tread section thereof. Vehicle tires are made of strong rubber reinforced with layers of fabric composed of synthetic or natural fibers such as nylon, rayon or cotton. The carcass or casing is cut up for use in various articles such as the roll of this invention. A plurality of discs 10 are thus used in making a roll. The discs 10 have a side 11 which was originally the outside surface of a vehicle tire. The other side 12 was originally the inside of a vehicle tire. Weftless fiber cords or fabric 13 are imbedded in rubber and reinforce the discs 10. The tire or fiber cords are located adjacent to the side 12 of the disc. The side 11 of the disc is predominantly rubber as it constitutes the road-engaging or tread surface of the tire from which the disc was cut.

The surface 11 is split, dressed or cut to make the discs which comprise the roll of this invention a substantially uniform thickness. It is customary for road-engaging vehicle tires to have surface grooving of irregular pattern called treads to enhance the frictional engagement of the vehicle tires with the road over which the vehicle is run. The initial splitting or dressing operation of the rubber surface 11 of the disc 10 substantially removes the tread surface of the tire carcass material. However, it is preferable and desirable to retain shallow indented treads as shown at 14. The retention of these shallow treads makes for a slightly irregular surface which enhances the locking of a plurality of discs together in laminated form and tends to prevent separate rotation of one disc relative to an adjacent disc.

The disc 10 is provided with a central aperture 15 of any desired shape to facilitate the mounting of the disc onto a shaft as will subsequently be described. A plurality of weight-reducing cutouts or openings 16 are located between the central aperture 15 and the outer periphery 17 of the disc 10. The outer periphery 17 is equipped with regularly spaced apart notches 18.

As best shown in FIGURES 1 and 3 the outer periphery 17 has a concave cross section 19. The concave cross section is defined by an annular raised side edge 20 on the side 11 of the disc and a spaced apart annular raised side edge 21 on the other side 12 of the disc 10. The cutting of the disc 10 in this manner is to provide the outer periphery with a concaved surface for a more aggressive finished roll. When the discs are placed together in a roll formation as shown in FIGURE 1 the roll is aggressive and long-wearing due to the peripheral edge concavities and the presence of fiber cords at the outer edges 17 of the discs as more clearly shown in FIGURES 5 and 6.

The purpose of the openings 16 is to effect an over-all lighter weight roll having the same compressible characteristics of an unbroken tire carcass disc and yet having substantially reduced weight which is necessary in many applications in agricultural machinery such as in bale throwing devices wherein the rolls are used on an attachment disposed a great distance from the carrying wheels. It is therefore the purpose of the present invention to provide an effective bale pitching roll of light weight. The shape of the openings 16 should be such that a maximum of tire carcass body is removed without impairing the strength or rotational balance of the discs. The openings 16 are thus shaped as isosceles trapezoids indicated by the numeral 22. The longest side of the trapezoid shown at 23 is located adjacent the disc periphery 17. The shortest side 24 of the trapezoid is located adjacent the central disc aperture 15. The sides of the trapezoid are shown at 25 and 26 and are of preferably equal length. These trapezoidal openings 22 are disposed at regular intervals around the disc body such that the rotation of the disc remains balanced. It should, however, be understood that the openings 16 need not be trapezoidal in shape as shown at 22 but in order to obtain the maximum reduction in disc weight and yet to retain a sufficient spiderlike supporting structure of the disc proper it has been found that the outside or peripheral side of the opening regardless of shape should be greater than the inner side of the opening adjacent the central aperture 15. Although four such openings 16 have been shown spaced uniformly around the central aperture 15, the number of such openings may be varied as long as the rotational balance of the disc is maintained.

It is preferable that the openings 16 in adjacent discs be offset from one another so that when the discs are placed together under endwise or axial compression there is a bulging of the disc material as shown at 27 penetrating into the opening 16 of an adjacent disc. This interengagement or effective locking of one disc with an adjacent disc is shown in FIGURE 3. This FIGURE 3 also shows the operation of the shallow tread 14 engaging the side 12 of an adjacent disc to enhance the locking of the discs together to avoid separate rotation thereof.

As best shown in FIGURE 1, the roll includes a shaft 28 which is adapted to pass through the central apertures 15 of a plurality of tire carcass discs 10. The discs are placed under endwise compression and held at both ends by platelike discs 29 and 30 preferably made of metal. The discs are locked in their position on the shaft by pins 31 and 32 passing through the shaft 28. In assembling the roll as shown in FIGURE 1 it is preferable that the shaft 28 be equipped with spaced apart holes to receive the locking pins 31 and 32. The discs 10 are put onto the shaft 28 and placed under axial compression. Thereafter the end plates 29 and 30 are mounted onto the ends of the shaft 28 and the pins 31 and 32 drop through the holes in the shaft 28 at which time the means for holding the discs under compression is removed allowing the discs to expand against the end caps or plates 29 and 30. The interlocking of the discs 10 by the engagement of disc material in the form of a bulge 27 into adjacent openings 16 and the surface engagement of the irregular treads 14 against the smooth surface of an adjacent disc all tend to lock the laminate of discs 10 as a single unit.

As shown in FIGURE 1, the roll is provided with longitudinally disposed flutes 33 which are formed of the notches 18 being in alignment with one another. It should thus be apparent that the openings 16 in order to be staggered with respect to the openings of adjacent discs and still have the notches 18 in alignment to form spaced longitudinal flutes 33 must either be punched differently from one another or rotated a distance equal to the space between adjacent notches 18 or a multiple of such a space. The openings 16 of adjacent discs are spaced at different positions relative to the outer peripheral notches 18.

In the operation of the roll of this invention the discs are assembled under endwise compression on a shaft 28 with the peripheral notches 18 preferably formed in longitudinal flutes 33 but it should be understood the discs may be placed on the shaft in a random relationship. Internally of the roll the weight reducing openings 16 are disposed adjacent the body of the disc material of an adjacent disc so that there is an interlocking of each of the discs along the roll as illustrated in FIGURE 3 wherein the bulge 27 enters into and locks with the opening 16 of an adjacent disc. The resultant roll is used in agricultural machinery and more particularly a bale throwing device in which the roll rotates at relatively high speed and engages the surface of a bale of hay to impart movement to that bale for delivery into a wagon or the like spaced at some distance from the pitching mechanism.

The concave surfaces of adjacent discs and the presence of surface-penetrating fiber cords 13 cause an aggressive contact of the roll with the hay and yet a contact which will not injury or destroy the surface of the bale of hay because of the compressibility or yielding character of the roll made of a plurality of laminated fabric reinforced rubber discs. FIGURES 5 and 6 show the discs as including a number of plies of fiber cords and rubber. A heavy rubber outer surface 34 constitutes the tread side 11 of the disc 10. A plurality of composite plies 35, 36, 37 and 38 of rubber with fiber cords imbedded therein are disposed on the rubber surface 34 in a particular fiber pattern as shown in FIGURE 5. The fiber cords of adjacent plies are angled at approximately 60° to each other so that at any point around the periphery there are fiber cords running to the outside of the discs.

I am aware that numerous details of construction may be varied throughout a wide range without departing from the principles disclosed herein and I therefore do not propose limiting the patent granted hereon otherwise than as necessitated by the appended claims.

What is claimed is:

1. A roller comprising an elongated shaft and a plurality of fabric-reinforced resilient rubber discs cut from the tread section of a tire casing and mounted on said shaft, said discs having the surface rubber of the tread area provided with shallow tread impressions, said discs being of substantially uniform thickness, means holding said plurality of discs under sufficient axial compression to cause the material of one disc to protrude into the tread impression of adjacent discs to resist relative rotation of adjacent discs.

2. In a farm machine for the harvesting, treating, and moving of crops, a roll construction adapted to be rotated and to intermittently engage and move a portion of a relatively heavy bale of harvested crop, said roll construction comprising an elongated shaft and a plurality of fabric-reinforced resilient rubber discs of substantially uniform thickness, said discs having centrally disposed apertures for mounting the discs on and over said elongated shaft, said discs having openings therethrough at a position between said central apertures and the peripheries of said discs, said openings disposed in a circumferential path around said discs whereby the discs are substantially rotationally balanced, means holding said discs in axial compression on said shaft, said openings of adjacent discs arcuately offset from each other, the compression of said discs causing the material of one disc to protrude into the openings of an adjacent disc to thereby resist separate rotation of one disc relative to an adjacent disc.

3. A roller comprising an elongated shaft and a plurality of fabric-reinforced resilient rubber discs of substantially uniform thickness, said discs having centrally disposed apertures for mounting the discs on and over said elongated shaft, said discs having openings therethrough at a position between said central apertures and the peripheries of said discs, said openings disposed in a circumferential path around said discs whereby the discs are substantially rotationally balanced, means holding said discs in axial compression on said shaft, said discs having regularly spaced apart notches in their peripheries, said openings of adjacent discs arcuately offset from each other, the compression of said disc causing the material of one disc to protrude into the openings of an adjacent disc, and the peripheral notches are in longitudinal alignment to form regular longitudinal flutes.

4. A roller comprising an elongated shaft and a plurality of fabric-reinforced resilient rubber discs, said discs having centrally disposed apertures for mounting on said shaft, said discs having openings in the body thereof between the central aperture and the periphery to form a disc spider, said openings having a generally isosceles trapezoidal shape and the short sides thereof located closest to the central apertures, and means holding said discs on said shaft under axial compression with the openings of one disc arcuately offset from the openings of an adjacent disc the material of the spider slightly penetrating the openings of an adjacent disc to restrain separate rotation of any one disc.

5. A roller as set forth in claim 4 in which the peripheral edges of said discs are concavely shaped in cross section.

6. In a bale thrower, a roll construction adapted to be rotated and to engage and throw a relatively heavy bale, said roll construction comprising an elongated shaft and a plurality of fabric-reinforced resilient rubber discs of substantially uniform thickness, said discs having central apertures of a diameter substantially equal to the diameter of said shaft, each of said discs further being formed to include an opening therethrough positioned radially outwardly of said central aperture, said discs mounted on said shaft so that the openings of adjacent discs are lapped, means for holding said discs in axial compression to distort said discs to cause the side wall portions of the openings of adjacent discs to interlock to thereby resist relative rotation of said discs when said roll construction engages and throws said bale.

7. In a bale thrower, a roll construction adapted to be rotated and to engage and throw a relatively heavy bale, said roll construction comprising an elongated and relatively small diameter shaft and a plurality of fabric reinforced resilient rubber discs of substantially uniform thickness, said discs having central apertures of a diameter substantially equal to the diameter of said shaft, each of said discs further being formed to include a plurality of openings therethrough positioned radially outwardly of said central aperture, said discs mounted on said shaft so that the openings of adjacent discs are lapped, means for holding said discs in axial compression sufficient to distort said discs to cause the side wall portions of the openings of adjacent discs to interlock to thereby resist relative rotation of said discs when said roll construction engages and throws said bale.

8. In a roll construction as defined in claim 7, said discs being formed of tire carcass material selected and trimmed so that relatively shallow and sharp edged grooves are provided in the circumferential peripheral edge and on one side of each of said discs, so that the cooperating grooves in the peripheral edges of said discs provide a bale engaging and throwing surface producing substantially no slippage of bales or burning of bale ties, and so that the grooves on one side of each of said discs cooperate with the other side of the adjacent disc to further resist relative rotation of said discs when said roll construction engages and throws said bale.

References Cited in the file of this patent
UNITED STATES PATENTS

| 2,378,643 | Losey | June 19, 1945 |
| 2,501,629 | Goulding | Mar. 21, 1950 |
| 2,921,426 | Heth | Jan. 19, 1960 |
| 2,949,189 | Haines | Aug. 16, 1960 |